INVENTOR:
WOLFGANG SCHROEDER

United States Patent Office 3,420,885
Patented Jan. 7, 1969

3,420,885
REGENERATION OF SOLUTIONS LOADED WITH CARBON DIOXIDE
Wolfgang Schroeder, Frankenthal, Pfalz, Germany, assignor to Badische Anilin- & Soda-Fabrik Aktiengesellschaft, Ludwigshafen (Rhein), Germany
Filed Aug. 21, 1964, Ser. No. 391,184
Claims priority, application Germany, Aug. 27, 1963, B 73,269
U.S. Cl. 260—584   3 Claims
Int. Cl. B01d 3/06

ABSTRACT OF THE DISCLOSURE

A process for regenerating solutions containing an alkali metal salt of an amino acid, an alkali metal salt of arseneous acid, or an alkali metal salt of carbonic acid or diethanolamine or triethanolamine which have been loaded with carbon dioxide at a pressure of from 5 to 100 atmospheres, by flashing said solution to atmospheric pressure and heating it in a steam-heated desorber for further desorption.

---

Figure 1:
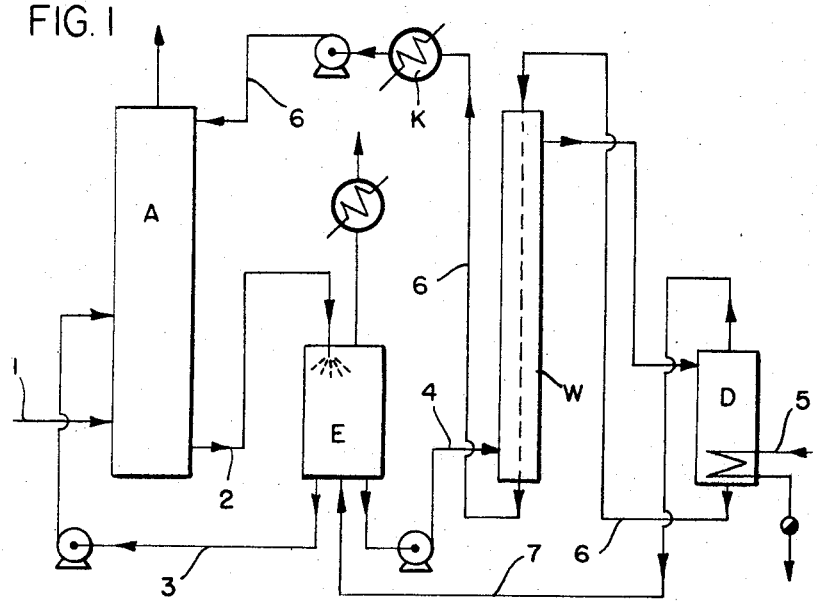

This invention relates to a process for the regeneration of solutions which have been used for the removal of carbon dioxide or other compounds from gases.

It is known that chemical scrubbing of gases for the removal of carbon dioxide can be carried out at superatmospheric pressure with a solution which is constantly recycled, the loaded solution being regenerated by one-stage or multi-stage pressure release and desorption. In order to increase the efficiency of the heat supplied to the desorber, indirect heat exchange is effected between the vapors saturated with steam which ascend from the desorber and the relatively cold loaded solution which leaves the absorber.

Indirect heat exchange and direct heat exchange have also been carried out simultaneously by superposing an indirect heat exchanger immediately on the desorber. Hot liquor from the bottom of the desorber serves as the heating medium for the indirect heat exchange, while the hot vapors rising from the desorber give up their heat direct to the descending liquor in the heat exchanger.

The prior art methods have the disadvantage that large exchange surfaces are required for the indirect heat exchange. The combination of indirect heat exchange with direct heat exchange, especially when large amounts of gas are liberated in the desorber, requires considerable expenditure for equipment.

I have now found that heat supplied for desorption of solute gases is best utilized when the regeneration of solutions which have been loaded at a pressure of from 5 to 100 atmospheres is carried out by flashing the solution to atmospheric pressure in one to three stages, heating it in a steam-heated desorber, and recycling the hot vapors saturated with steam leaving the top of the desorber to that flash vessel in which the solution has been flashed to atmospheric pressure, thus bringing them into direct heat exchange with the cold solution which has been regenerated only by flashing.

Flashing may be carried out in one, two or three stages.

A preferred embodiment of the process consists in preheating the solution, prior to introduction into the steam-heated desorber, in a heat exchanger by the hot liquor flowing from the bottom of the desorber, and introducing the hot vapors saturated with steam leaving the top of the heat exchanger, together with the vapors from the desorber, into that flash vessel in which the solution has been flashed to atmospheric pressure.

The direct heat exchange used in the process according to this invention affords a very high degree of efficiency without additional equipment because the hot vapors are brought into contact with the loaded solvent at a point where the latter has the lowest temperature so that the temperature difference ΔT of the two media and consequently the amount of heat which can be transferred are at a maximum. Moreover the degree of efficiency of the degassing obtained by flashing the solution is improved by the intense turbulence in the solution produced by gas bubbles.

As a result of the higher inlet temperature of the solution into the desorber, the heat required for heating up the solution is decreased by about 5 to 10% as compared with the prior art methods.

The process is generally applicable for regeneration of chemical solutions which have been used for separating carbon dioxide from gases containing the same, for example synthesis gases, cracked gases or natural gas, under pressure.

The following absorbents are particularly suitable for use in the process according to the present invention:

(a) Aqueous solutions of sodium or potassium salts of amino alkanoic acids containing from 2 to 4 carbon atoms, especially N-methyl-α-aminopropionic acid and dimethyl glycocoll. The concentration of the salt is from 1 to 5 moles, preferably from 2 to 4 moles, per liter of solution.

(b) Aqueous solutions of the sodium or potassium salts of arsenious acid or carbonic acid. The salt concentration is from 1 to 3, preferably from 2 to 3, moles per liter of solution.

(c) Aqueous solutions of diethanolamine and triethanolamine with concentrations of from 1 to 4, preferably from 2 to 3, moles per liter of solution.

The process is applicable if the carbon dioxide pressure at the bottom of the absorber exceeds 1 atmosphere. The preferred pressure range is from 1 to 15, preferably from 2 to 12, atmospheres. The total pressure in the absorber is usually from 5 to 100, preferably from 20 to 80, atmospheres.

In carrying out the process, the solutions to be regenerated are supplied from the absorber in which they have been loaded with carbon dioxide first into one or more flash vessels in which partial degassing of the solution takes place by a single or stagewise decrease in the pressure. In general, it is not necessary to use more than two flash vessels. The use of two stages is usually the most economic solution.

The pressure in the first flash stage depends on the conditions in the absorber. It is usually between 4 and 15 atmospheres. In the second stage, the pressure is 1 atmosphere or slightly above. On account of the heat of desorption, the temperature is from 5 to 15° C. lower than in the first flash vessel, for example from 60 to 90° C. It is into the second flash vessel that the hot steam-saturated vapors leaving the top of the desorber are introduced. The vapors usually have a temperature between 80 and 110° C., especially between 90 and 105° C.

For maximum utilization of the heat contained in the vapors the vapors are supplied to the bottom of the second flash vessel. In a preferred embodiment this comprises two zones filled with tower packing. In the top zone the flashed solvent is degassed, while in the bottom zone the heat exchange between the vapors and the solution is effected. Gas outlets are provided both at the top of the vessel and between the two packed zones. Other efficient designs of flash vessels may also be used.

Using a plurality of flash stages has the advantage that inert gases dissolved in the solution can be liberated ahead of the last stage. In this way a pure carbon dioxide is obtained in the last flash stage. The solution flashed to atmospheric pressure which flows from the bottom of the flash vessel is advantageously passed by a pump into an indirect heat exchanger in which it is heated up to temperatures of 80° to 100° C. with the liquor leaving the bottom of the desorber. The preheated solution then passes from the heat exchanger into the steam-heated desorber in which it is freed from residual carbon dioxide. In general the solution contains from 5 to 50 cubic meters (S.T.P.) of carbon dioxide per cubic meter when it enters the desorber. The desorber may be heated either directly or indirectly with steam at a temperature of 100° to 140° C. The partial pressure of carbon dioxide over the regenerated solution is in general $5 \times 10^{-4}$ to $100 \times 10^{-4}$ atmospheres after leaving the desorber. The vapors saturated with steam which leave the desorber are introduced at a temperature of 90° to 105° C. into the lower portion of the flash vessel and contribute, by raising the temperature in the bottom of the flash vessel, to the improvement in the effect of the degassing in the flash vessel. This also has the consequence that the temperature of the solution, still partly loaded, rises upon entry into the desorber, so that there is a saving in steam in the preheating of the liquor to the boiling point in the desorber.

A particular embodiment of the process consists in branching off from the flash vessel a portion of the solution, released to atmospheric pressure, flowing from the bottom and using it for preliminary washing of the gas containing carbon dioxide. In this way the amount of solution to be completely degassed is decreased to the amount required for the fine washing.

The invention is further illustrated by the following examples which are given with reference to the accompanying in which two flow diagrams are set forth.

EXAMPLE 1

FIG. 1 of the drawing reproduces a flow sheet for a plant for the regeneration of triethanolamine solution. A synthesis gas which is at a pressure of 25 atmospheres is introduced through line 1 above the bottom of an absorber A filled with tower packing and washed with a 35% by weight triethanolamine solution. The synthesis gas contains 37% by volume of carbon dioxide, 60% by volume of hydrogen and 3% by volume of carbon monoxide. The washed gas leaves the top of the absorber A with a content of 0.1% by weight of carbon dioxide. Fine washing is effected in the upper portion of the absorber with completely regenerated solution and the lower portion of the absorber is used for the preliminary washing.

The solution withdrawn from the bottom of the absorber A through line 2 is loaded with 24 cubic meters (S.T.P.) of $CO_2$ per cubic meter of solution and has a temperature of 70° to 72° C. It is flashed to atmospheric pressure in flash vessel E, the liquor thus being cooled to 65° C., 80% by volume of the solution degassed by flashing is recirculated back through line 3 to the middle portion of absorber A (loading 14 cubic meters (S.T.P.) per cubic meter). The remaining liquor is pumped through line 4 and a heat exchanger W in which it is brought into indirect heat exchange with the hot liquor, regenerated by means of steam, from the desorber D. A further portion of the solute carbon dioxide is expelled here so that the liquor passes with a content of 7 to 8 cubic meters (S.T.P.) of carbon dioxide per cubic meter of liquor at approximately 90° C. into the desorber D. The desorber D is also filled with tower packing and heated indirectly by the steam pipe 5. The amount of steam is regulated so that the temperature at the top of the desorber is the same as at the outlet of the heat exchanger W. The hot, regenerated liquor from the bottom of the desorber D, which still contains 1 to 2 cubic meters (S.T.P.) of carbon dioxide per cubic meter, is recirculated back through line 6, heat exchanger W and cooler K to the top of the absorber A.

The hot vapors saturated with steam liberated in the heat exchanger W and in the desorber D are united and introduced through line 7 into the flash vessel E. Here they give up their heat in direct heat exchange to such an extent that the temperature of the gas liberated is about equal to that of the desorber is the same as at the outlet of the heat exchanger W. The hot, regenerated liquor from the bottom of the desorber D, which still contains 1 to 2 cubic meters (S.T.P.) of carbon dioxide per cubic meter is recirculated back through line 6, heat exchanger W and cooler K to the top of the absorber A.

The hot vapors saturated with steam liberated in the heat exchanger W and in the desorber D are united and introduced through line 7 into the flash vessel E. Here they give up their heat in direct heat exchange to such an extent that the temperature of the gas liberated is about equal to that of the effluent liquor.

When working in this way, a specific steam consumption of 0.5 kg. of steam per kg. of absorbed carbon dioxide is achieved.

When working by the prior art method, the steam consumption is 10% higher for the same regenerating effect.

EXAMPLE 2

Figure 2:
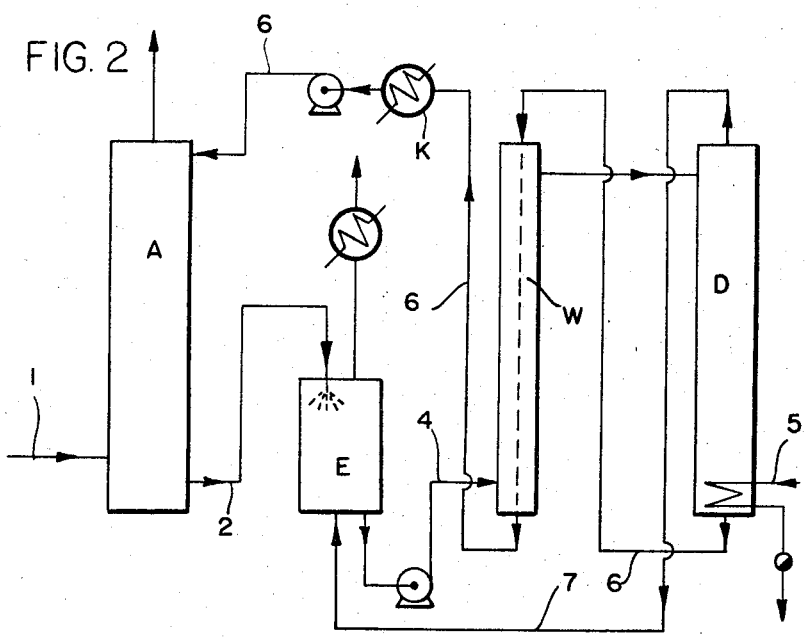

FIG. 2 of the drawing reproduces a plant for the regeneration of 3.5 M aqueous solution of the potassium salt of N-methyl-aminopropionic acid.

A synthesis gas which is at a pressure of 25 atmospheres and has the same composition as that described in Example 1 is introduced through line 1 above the bottom of an absorber A filled with tower packing. The washed gas leaves the top of the absorber A with a content of 0.05% by volume of carbon dioxide.

The solution withdrawn from the bottom of the absorber through line 2 is loaded with 49 cubic meters (S.T.P.) of carbon dioxide per cubic meter of solution and has a temperature of 77 to 78° C. It is flashed to atmospheric pressure in a flash vessel E.

The steam-saturated vapors leaving the top of the desorber D at approximately 90 to 95° C. flow through pipe 7 into flash vessel E. In this way, the temperature of the solution is increased to 79 to 80° C. and the loading decreased to 46 cubic meters (S.T.P.) of carbon dioxide per cubic meter of solution. The solution is pumped through line 4 and a heat exchanger W in which it is brought into indirect heat exchange with the hot liquor, regenerated by means of steam, from the desorber D. The solution entering the desorber D has a temperature of 90 to 95° C. and a loading of approximately 40 cubic meters (S.T.P.) of carbon dioxide per cubic meter. The desorber is filled with tower packing and heated indirectly by means of a recirculating evaporator.

The amount of steam supplied through line 5 is regulated so that the temperature at the top of the desorber is the same as at the outlet of the heat exchanger W or only slightly higher. The solution at the bottom of the desorber then contains 23 cubic meters (S.T.P.) of carbon dioxide per cubic meter and has a temperature of 108 to 110° C.

It is recirculated back to the top of the absorber A through line 6, heat exchanger W and cooler K. The hot vapors saturated with steam liberated in the heat exchanger W and in the desorber D are united and introduced through line 7 into the bottom of flash vessel E. Here they give up their heat in direct heat exchange to such an extent that the temperature of the gas liberated is about equal to that of the effluent liquor.

When working in this way, a specific steam consumption of 1.55 kg. of steam per kg. of absorbed carbon dioxide is achieved.

When working by the prior art method, the steam consumption is 1.61 to 1.62 kg. of steam per kg. of absorbed carbon dioxide for the same regenerating effect.

EXAMPLE 3

The plant shown in FIG. 2 of the accompanying drawings is used for regenerating a 1.75 M aqueous solution of potassium arsenite.

A synthesis gas which is at a pressure of 25 atmospheres and has the same composition as that described in Example 1 is introduced through line 1 above the bottom of an absorber A filled with tower packing. The washed gas leaves the top of the absorber A with a content of 0.1% by volume of carbon dioxide.

The solution withdrawn from the bottom of the absorber through line 2 is loaded with 29 cubic meters (S.T.P.) of carbon dioxide per cubic meter of solution and has a temperature of 79 to 81° C. It is flashed to atmospheric pressure in flash vessel E.

The steam-saturated vapors leaving the top of the desorber D at approximately 90° C. flow through pipe 7 into flash vessel E. In this way, the temperature of this solution is increased by 2 to 3° C., so that the temperature of the solution leaving the flash vessel is approximately 75° C. The $CO_2$ loading of the solution is then 19 cubic meters (S.T.P.) per cubic meter.

The solution is pumped through line 4 and a heat exchanger W in which it is brought into indirect heat exchange with the hot liquor, regenerated by means of steam, from the desorber D. The solution entering the desorber D has a temperature of 90° C. and a loading of approximately 12 to 14 cubic meters (S.T.P.) of carbon dioxide per cubic meter. The desorber is filled with tower packing and heated indirectly by means of a recirculating evaporator. The amount of steam supplied through line 5 is regulated so that the temperature at the top of the desorber is the same as at the outlet of the heat exchanger W or only slightly higher. The solution at the bottom of the desorber then contains 2 to 3 cubic meters (S.T.P.) of carbon dioxide per cubic meter and has a temperature of 105 to 107° C. It is recirculated back to the top of the absorber A through line 6, heat exchanger W and cooler K.

The hot vapors saturated with steam liberated in the heat exchanger W and in the desorber D are united and introduced through line 7 into the bottom of flash vessel E. Here they give up their heat in direct heat exchange to such an extent that the temperature of the gas liberated is about equal to that of the effluent liquor.

When working in this way, a specific steam consumption of 1.18 kg. of steam per kg. of absorbed carbon dioxide is achieved.

When working by the prior art method, the steam consumption is 1.23 kg. of steam per kg. of absorbed carbon dioxide for the same regenerating effect.

I claim:

1. A process for the regeneration of solutions containing a compound selected from the group consisting of an alkali metal salt of an amino alkanoic acid of 2 to 4 carbon atoms, an alkali metal salt of arsenious acid, an alkali metal salt of carbonic acid, diethanolamine and triethanolamine loaded with carbon dioxide, said solutions having been loaded at a pressure of from 5 to 100 atmospheres, by flashing said solution to atmospheric pressure in one to three stages and heating it in a steam-heated desorber, wherein the hot vapors saturated with steam leaving the top of the desorber are recycled to that flash zone in which the solution has been flashed to atmospheric pressure, and thus brought into direct heat exchange with the cold solution regenerated only by flashing, and recovering said regenerated solution.

2. A process as claimed in claim 1 wherein the solution, prior to introduction into the steam-heated desorber, is preheated in a heat exchanger by the hot liquor flowing from the bottom of the desorber, and the hot vapors saturated with steam leaving the top of the heat exchanger and the vapors coming from the desorber are introduced into that flash vessel in which the solution has been flashed to atmospheric pressure.

3. A process as claimed in claim 1 wherein an aqueous solution of triethanolamine is used.

References Cited
UNITED STATES PATENTS

| | | | |
|---|---|---|---|
| Re. 18,958 | 9/1933 | Bottoms. | |
| 1,959,714 | 5/1934 | Govers | 260—584 XR |
| 2,914,469 | 11/1959 | Anderson et al. | 260—584 XR |

FLOYD D. HIGEL, *Primary Examiner.*

U.S. Cl. X.R.

23—139, 144, 150; 203—88; 260—482, 534